United States Patent [19]
Parmar et al.

[11] Patent Number: 5,148,388
[45] Date of Patent: Sep. 15, 1992

[54] 7 TO 3 COUNTER CIRCUIT

[75] Inventors: Vijay Parmar; Mayur Mehta, both of Austin, Tex.

[73] Assignee: Advanced Micro Devices, Inc., Sunnyvale, Calif.

[21] Appl. No.: 702,594

[22] Filed: May 17, 1991

[51] Int. Cl.⁵ .................................. G06F 7/50
[52] U.S. Cl. ........................................ 364/786
[58] Field of Search .......................... 364/786, 784

[56] References Cited

U.S. PATENT DOCUMENTS

| | | | |
|---|---|---|---|
| 3,535,502 | 11/1967 | Clapper | 364/786 |
| 3,603,776 | 9/1971 | Weinberger | 364/786 |
| 3,636,334 | 1/1972 | Svoboda | 364/786 |
| 3,711,692 | 1/1973 | Batcher | 364/786 |
| 3,723,715 | 3/1973 | Chen et al. | 364/786 |
| 3,741,475 | 6/1973 | Hardy et al. | 364/786 |
| 4,399,517 | 8/1983 | Niehaus et al. | 364/784 |
| 4,488,253 | 12/1984 | Lerouge | 364/786 |
| 4,604,723 | 8/1986 | Burrows | 364/786 |

Primary Examiner—David H. Malzahn
Attorney, Agent, or Firm—Foley & Lardner

[57] ABSTRACT

A 7 to 3 counter adds seven digital inputs all having a weight X and provides a three-bit sum including a sum bit having a weight X, a first carry bit having a weight 2X and a second carry bit having a weight 4X. The counter includes seven inputs arranged in consecutive order for receiving a binary 1 or a binary 0 input signal level at each of the inputs. A first circuit means is coupled to all of the inputs and provides the sum bit responsive to the binary levels of the inputs. Second, third, and fourth circuit means provides first, second and third intermediate carry bits. A full adder includes a first carry output and a second carry output and provides the first carry bit at the first carry output and the second carry bit at the second carry output responsive to the binary levels of the first, second, and third intermediate carry bits.

10 Claims, 1 Drawing Sheet

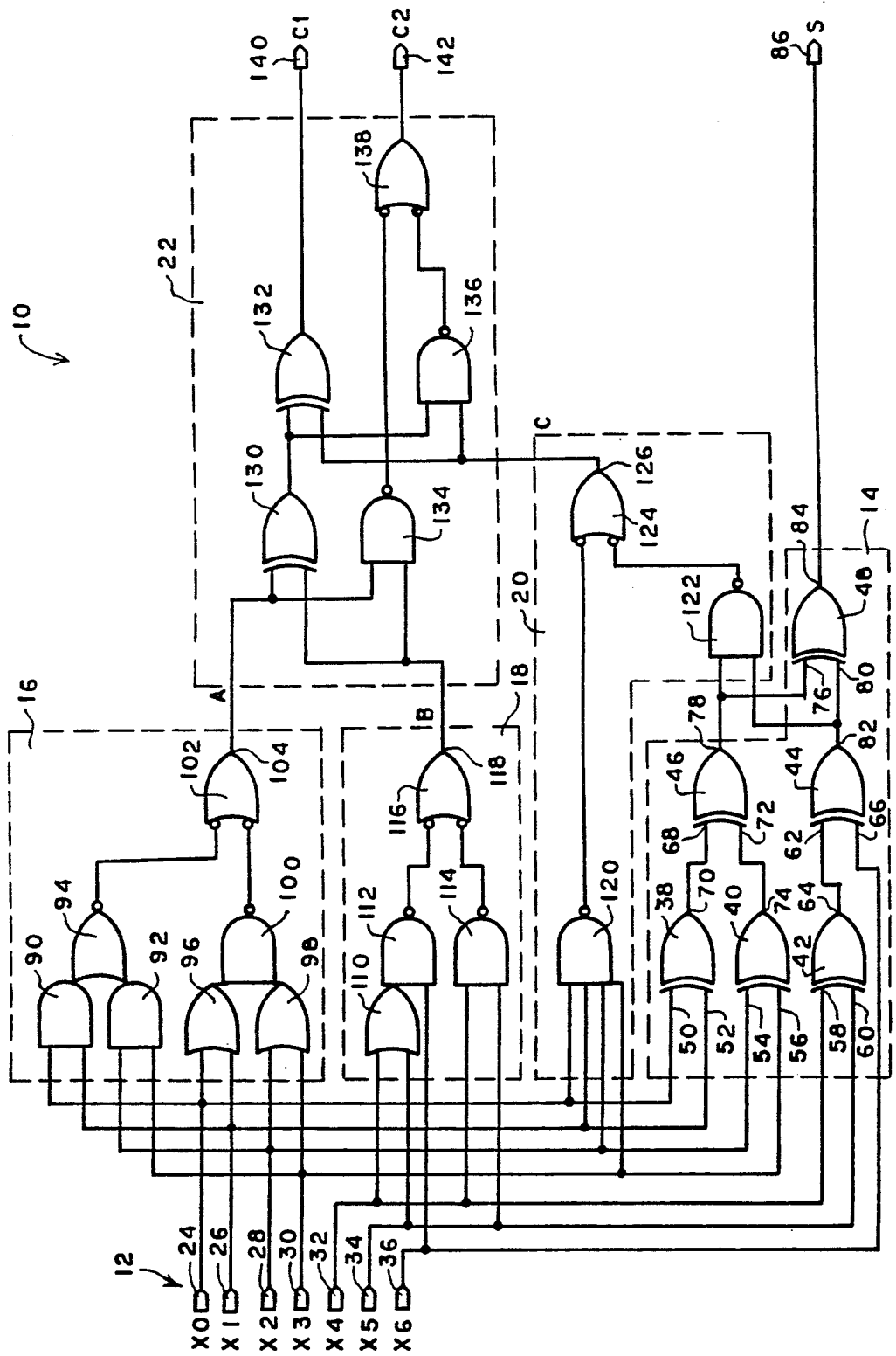

7 TO 3 COUNTER CIRCUIT

BACKGROUND OF THE INVENTION

The present invention generally relates to an improved counter and more particularly to an improved 7 to 3 counter for adding seven digital inputs all having a weight X and providing a three-bit sum including a sum bit having a weight X, a first carry bit having a weight 2X, and second carry bit having a weight 4X. The improved 7 to 3 counter of the present invention exhibits a 33% reduction in gate delays and thus a 33% improvement in processing speed over prior art 7 to 3 counters formed solely of full adders.

Multiplication units in computing systems represent one of the bottlenecks in overall system performance because multiplication is an inherently slow operation. This is caused by the fact that, in multiplication, a large number of partial products must be added to produce the final product. For example, 16×16 bit multiplication, using a shift-and-add algorithm, requires 16 partial products to be added resulting in 15 carry propagation adder delays to derive the final product.

Different types of counter schemes have been used to speed up the addition of partial products. For example, 2 full adders or 3 to 2 counters can be used to reduce three partial products to two at each stage. An array of 7 to 3 counter circuits will reduce seven partial products to three at each stage. Thus, an efficient implementation of a 7 to 3 counter results in a faster multiplication scheme. One such solution utilizes a 7 to 3 counter which is formed from four full adders. The time to complete such a multiplication may be measured in terms of gate delays with a simple gate such as, for example, a NAND gate, a NOR gate, or inverter, being given a weight of 1 gate delay, a complex gate like an AND-OR-invert gate being given a weight of 1.5 gate delays, and an exclusive OR gate being given a weight of 2 gate delays.

The 7 to 3 counter using four full adders exhibits 12 gate delays. A 16×16 bit multiplier formed from such counters requires two arrays of the 7 to 3 counters and one array of full adders. A full adder alone exhibits 4 gate delays. As a result, a 16×16 bit multiplier utilizing the aforementioned 7 to 3 counters exhibits an overall gate delay of 28.

Unfortunately, 16×16 bit multipliers incorporating 7 to 3 counters formed solely from full adders do not approach the processing speeds offered by other solutions. Hence, there is a need in the art for an improved 7 to 3 counter which exhibits reduced gate delay as compared to the prior art 7 to 3 counters to improve the overall gate delay of a 16×16 bit multiplier utilizing such counters. The present invention provides a 7 to 3 counter which, when utilized in a n×n bit multiplier, enables the multiplier to surpass most multiplier configurations in terms of gate delays. To that end, a 16×16 bit multiplier utilizing the 7 to 3 counter of the present invention exhibits 20 gate delays for a 16×16 bit multiplication. The 7 to 3 counter of the present invention provides a 33% reduction in gate delay over the prior art 7 to 3 counter formed solely of full adders.

SUMMARY OF THE INVENTION

The present invention therefore provides a 7 to 3 counter for adding seven digital inputs all having a weight X and providing a three-bit sum of the inputs including a sum bit having a weight X, a first carry bit having a weight 2X, and second carry bit having a weight 4X. The counter includes input means consisting of seven inputs arranged in consecutive order for receiving a binary 1 or a binary 0 input signal level at each of the inputs, first circuit means coupled to all the inputs and including a sum output for providing at the sum output the sum bit responsive to the binary levels of the inputs and second circuit means coupled to the first four inputs of the inputs and including a first intermediate carry output for providing a first intermediate carry bit at the first intermediate carry output responsive to the binary levels of the first four inputs. The counter further includes third circuit means coupled to the last three inputs of the inputs and including a second intermediate carry output for providing a second intermediate carry bit at the second intermediate carry output responsive to the binary levels of the last three inputs, fourth circuit means coupled to all the inputs and including a third intermediate carry output for providing a third intermediate carry bit at the third intermediate carry output responsive to the binary levels of all the inputs, and full adder means coupled to the first, second, and third intermediate carry outputs and including a first carry output and a second carry output for providing the first carry bit at the first carry output and the second carry bit at the second carry output responsive to the binary levels of the first, second, and third intermediate carry bits.

The present invention further provides a 7 to 3 counter for adding seven digital inputs all having a weight X and providing a three-bit sum of the inputs including a sum bit having a weight X, a first carry bit having a weight 2X, and a second carry bit having a weight 4X. The counter includes input means consisting of seven inputs arranged in consecutive order for receiving a binary 1 or a binary 0 input signal level at each of the inputs and first circuit means coupled to all the inputs and including a sum output for providing at the sum output a binary 1 level responsive to an odd number of the inputs being at a binary 1 level or a binary 0 level responsive to an even number of the inputs being at a binary 1 level. The counter further includes second circuit means coupled to the first four inputs of the inputs and including a first intermediate carry output for providing a binary 1 level at the first intermediate carry output responsive to two or more of the first four inputs being at a binary 1 level and third circuit means coupled to the last three inputs of the inputs and including a second intermediate carry output for providing a binary 1 level at the second intermediate carry output responsive to two or three of the last three inputs beings at a binary 1 level. The counter further includes fourth circuit means coupled to all the inputs and including a third intermediate carry output for providing a binary 1 level at the third intermediate carry output responsive to all of the first four inputs of the inputs being at a binary 1 level, or one or three of the first four inputs of the inputs being at a binary 1 level and one or three of the last three inputs of the inputs being at a binary 1 level and full adder means coupled to the first, second, and third intermediate carry outputs and including a first carry output and a second carry output for providing said first carry bit at the first carry output and the second carry bit at the second carry output responsive to the binary levels at the first, second, and third intermediate carry outputs.

BRIEF DESCRIPTION OF THE DRAWING

The features of the present invention which are believed to be novel are set forth with particularity in the appended claims. The invention, together with further objects and advantages thereof, may best be understood by making reference to the following description in conjunction with the accompanying drawing, in the sole FIGURE of which like reference numerals identify identical elements, and wherein the sole FIGURE is a schematic circuit diagram of 7 to 3 counter conFIGUREd in accordance with a preferred embodiment of the present invention.

DESCRIPTION OF THE PREFERRED EMBODIMENT

Referring now to the sole FIGURE, it illustrates, in schematic circuit diagram form, a 7 to 3 counter 10 conFIGUREd in accordance with a preferred embodiment of the present invention. The 7 to 3 counter 10 generally includes input means 12, a first circuit portion 14, a second circuit portion 16, a third circuit portion 18, a fourth circuit portion 20, and a full adder 22.

The input means 12 includes seven inputs 24, 26, 28, 30, 32, 34, and 36. The inputs are arranged in consecutive order and are denoted by X0, X1, X2, X3, X4, X5, and X6 respectively. Each of the inputs is arranged to receive a digital input, all having the same weight X and being at a binary 1 or a binary 0 input signal level. As will be seen hereinafter, the 7 to 3 counter 10 is arranged to add the seven digital inputs all having a weight X and to provide a three-bit sum of the inputs including a sum bit having a weight X, a first carry bit having a weight 2X, and a second carry bit having a weight 4X. The first circuit portion 14 provides the sum bit. The second circuit portion 16 provides a first intermediate carry bit A, the third circuit portion 18 provides a second intermediate carry bit B, and a fourth circuit portion 20 provides a third intermediate carry bit C. All of the intermediate carry bits A, B, and C are of the same weight 2X and the full adder 22 is arranged to provide, in response to the intermediate carry bits, the first carry bit C1 having a weight 2X and a second carry bit C2 having a weight 4X.

The first circuit means 14 is coupled to each of the inputs 24, 26, 28, 30, 32, 34, and 36 of the input means 12 and includes a first exclusive OR gate 38, a second exclusive OR gate 40, a third exclusive OR gate 42, a fourth exclusive OR gate 44, a fifth exclusive OR gate 46, and a sixth exclusive OR gate 48.

The first exclusive OR gate 38 includes a first input 50 which is coupled to input 24 and a second input 52 which is coupled to input 26. The second exclusive OR gate 40 includes a first input 54 which is coupled to the third input 28 and a second input 56 which is coupled to the fourth input 30. The third exclusive OR gate 42 includes a first input 58 which is coupled to the fifth input 32 and a second input 60 which is coupled to the sixth input 34. The fourth exclusive OR gate 44 includes a first input 62 which is coupled to the output 64 of the third exclusive OR gate 42 and a second input 66 which is coupled to the seventh input 36. The fifth exclusive OR gate 46 includes a first input 68 which is coupled to the output 70 of the first exclusive OR gate 38 and a second input 72 which is coupled to the output 74 of the second exclusive OR gate 40. The sixth exclusive OR gate 48 includes a first input 76 which is coupled to the output 78 of the fifth exclusive OR gate 46 and a second input 80 which is coupled to the output 82 of the fourth exclusive OR gate 44. Lastly, the sixth exclusive OR gate 48 includes a output 84 which forms the output of the first circuit means 14 and is coupled to a sum output 86 where the sum bit having a weight X is provided.

The second circuit portion 16 includes a first AND gate 90, a second AND gate 92, a NOR gate 94, a first OR gate 96, a second OR gate 98, a first NAND gate 100, and a second NAND gate 102. The first AND gate 90 includes a first input which is coupled to the first input 24 and a second input which is coupled to the second input 26. The second AND gate 92 includes a first input which is coupled to the third input 28 and a second input which is coupled to the fourth input 30. NOR gate 94 includes a first input which is coupled to the output of AND gate 90 and a second input which is coupled to the output of AND gate 92. As will be appreciated by those skilled in the art, AND gates 90 and 92 and NOR gate 94 comprise a complex gate.

The first OR gate 96 includes a first input which is coupled to the first input 24 and a second input which is coupled to the second input 26. The second OR gate 98 includes a first input which is coupled to the third input 28 and a second input which is coupled to the fourth input 30. The first NAND gate 100 includes a first input which is coupled to the output of OR gate 96 and a second input which is coupled to the output of OR gate 98. As will be appreciated by those skilled in the art, OR gates 96 and 98 and NAND gate 100 comprise a complex gate.

The second NAND gate 102 includes a first input which is coupled to the output of NOR gate 94 and a second input which is coupled to the output of the first NAND gate 100. The second NAND gate 102 also includes an output 104 which forms the first intermediate carry output of the 7 to 3 counter 10 which provides the first intermediate carry bit A.

The third circuit means 18 includes an OR gate 110, a first NAND gate 112, a second NAND gate 114 and a third NAND gate 116. OR gate 110 includes a first input which is coupled to the fifth input 32 and a second input which is coupled to the sixth input 34. The first NAND gate 112 includes a first input which is coupled to the output of OR gate 110 and a second input which is coupled to the seventh input 36. The second NAND gate 114 includes a first input which is coupled to the fifth input 32 and a second input which is coupled to the sixth input 34. The third NAND gate 116 includes a first input which is coupled to the output of the first NAND gate 112 and a second input which is coupled to the output of the second NAND gate 114. NAND gate 116 also includes an output 118 which forms the second intermediate carry output which provides the second intermediate carry bit B.

The fourth circuit means 20 includes a first NAND gate 120, a second NAND gate 122, and a third NAND gate 124. The first NAND gate includes a first input which is coupled to the first input 24, a second input which is coupled to the second input 26, a third input which is coupled to the third input 28, and a fourth input which is coupled to the fourth input 30. The second NAND gate 122 includes a first input which is coupled to the output 78 of exclusive OR gate 46 and a second input which is coupled to the output 82 of the exclusive OR gate 44. The third NAND gate 124 includes a first input which is coupled to the output of the first NAND gate 120 and a second input which is coupled to the output of the second NAND gate 122.

NAND gate 124 also includes an output 126 which forms the third intermediate carry output which provides the third intermediate carry bit C.

The full adder 22 is of the type well known in the art and as a result, will not be described in detail herein. The full adder 22, however, generally includes a first exclusive OR gate 130, a second exclusive OR gate 132, a first NAND gate 134, a second NAND gate 136, and third NAND gate 138.

The full adder further includes a first carry output 140 which provides the first carry bit C1 having a weight 2X. The full adder 22 further includes a second carry output 142 which provides the second carry bit C2 having a weight 4X. As well known in the art, the full adder 22 is arranged to add the intermediate carry bits A, B, and C having a weight 2X to provide the first carry bit C1 having a weight 2X and the second carry bit C2 having a weight 4X.

In operation, the first circuit means 14 is responsive to an odd number of the inputs 24, 26, 28, 30, 32, 34, and 36 of the input means 12 being at a binary 1 level to provide a sum bit having a binary 1 level. The first circuit means 14 is also responsive to an even number of the inputs of the input means 12 being at a binary 1 level to provide a sum bit having a binary 0 level. As previously mentioned, the sum bit has a weight X which is the same weight as each of the inputs to the input means 12.

The second circuit means 16 is responsive to the binary levels of the first four inputs 24, 26, 28, and 30 of the input means 12 to provide the first intermediate carry bit A at a binary 1 level responsive to two or more of the first four inputs of the input means 12 being at a binary 1 level. The third circuit means 18 is responsive to the last three inputs 32, 34, and 36 of the input means 12. It provides a second intermediate carry bit B at a binary 1 level responsive to two or three of the last three inputs of the input means 12 being at a binary 1 level.

The fourth circuit means is coupled to all of the seven inputs of the input means 12 either through the NAND gate 120 or through the exclusive OR gates 38, 40, 42, 44, and 46 of the first circuit means 14. It provides the third intermediate carry bit C having a binary 1 level when all of the first four inputs 24, 26, 28, and 30 of the input means 12 are at a binary 1 level or when one or three of the first four inputs of the input means 12 are at a binary 1 level and when one or three of the last three inputs of the input means 12 are at a binary 1 level.

As previously mentioned, each of the first, second, and third intermediate carry bits have a weight of 2X. In a known manner, the full adder 22 is responsive to the binary levels of the first, second, and third intermediate carry bits to provide the first carry bit C1 at output 140 and the second carry bit C2 at output 142. The first carry bit C1 has a weight 2X and the second carry bit C2 has a weight 4X.

As previously mentioned, the 7 to 3 counter 10 exhibits 8 gate delays compared to the prior art 7 to 3 counter which incorporates solely full adder which exhibits 12 gate delays. This results in a 33% reduction in gate delay. A 16×16 multiplier incorporating 7 to 3 counters requires two 7 to 3 counters and a full adder wherein the full adder exhibits 4 gate delays. As a result, a 16×16 multiplier utilizing the 7 to 3 counter of the present invention will exhibit a total of 20 gate delays as compared to 28 gate delays for a 16×16 bit multiplier incorporating the prior art 7 to 3 counters. Hence, with the 7 to 3 counter of the present invention, a significant reduction in gate delay is achieved in a 16×16 bit multiplier.

While a particular embodiment of the present invention has been shown and described, modifications may be made, and it is therefore intended in the appended claims to cover all such changes and modifications which fall within the true spirit and scope of the invention as defined by the appended claims.

What is claimed is:

1. A 7 to 3 counter for adding seven digital inputs all having a weight X and providing a three-bit sum of said inputs including a sum bit having a weight X, a first carry bit having a weight 2X and a second carry bit having a weight 4X, said counter comprising:
   input means consisting of seven inputs arranged in consecutive order for receiving a binary 1 or a binary 0 input signal level at each of said inputs;
   first circuit means coupled to all said inputs and including a sum output for providing at said sum output said sum bit responsive to the binary levels of said inputs;
   second circuit means coupled to the first four inputs of said inputs and including a first intermediate carry output for providing a first intermediate carry bit at said first intermediate carry output responsive to the binary levels of said first four inputs;
   third circuit means coupled to the last three inputs of said inputs and including a second intermediate carry output for providing a second intermediate carry bit at said second intermediate carry output responsive to the binary levels of said last three inputs;
   fourth circuit means coupled to all said inputs and including a third intermediate carry output for providing a third intermediate carry bit at said third intermediate carry output responsive to the binary levels of said inputs; and
   full adder means coupled to said first, second, and third intermediate carry outputs and including a first carry output and a second carry output for providing said first carry bit at said first carry output and said second carry bit at said second carry output responsive to the binary levels of said first, second, and third intermediate carry bits.

2. A 7 to 3 counter as defined in claim 1 wherein said first circuit means are arranged to provide a binary 1 level at said sum output responsive to an odd number of said inputs being at a binary 1 level and to provide a binary 0 level at said sum output responsive to an even number of said inputs being at a binary 1 level.

3. A 7 to 3 counter as defined in claim 1 wherein said second circuit means are arranged to provide a binary 1 level at said first intermediate carry output responsive to two or more of the first four inputs of said inputs being at a binary 1 level.

4. A 7 to 3 counter as defined in claim 1 wherein said third circuit means are arranged to provide a binary 1 level at said second intermediate carry output responsive to two or three of the last three inputs of said inputs being a binary 1 level.

5. A 7 to 3 counter as defined in claim 1 wherein said fourth circuit means are arranged to provide a binary 1 level at said third intermediate carry output responsive to all of the first four inputs of said inputs being at a binary 1 level, or one or three of said first four inputs of said inputs being at a binary 1 level and one or three of the last three inputs of said inputs being at a binary 1 level.

6. A 7 to 3 counter as defined in claim 1 wherein said first circuit means comprises first, second, third, fourth, fifth, and sixth exclusive OR gates, said first exclusive OR gate including a first input coupled to the first one of said inputs, a second input coupled to the second one of said inputs, and an output, said second exclusive OR gate including a first input coupled to the third one of said inputs, a second input coupled to the fourth one of said inputs, and an output, said third exclusive OR gate including a first input coupled to the fifth one of said inputs, a second input coupled to the sixth one of said inputs, and an output, said fourth exclusive OR gate including a first input coupled to the seventh one of said inputs, a second input coupled to said third exclusive OR gate output, and an output, said fifth exclusive OR gate including a first input coupled to said first exclusive OR gate output, a second input coupled to said second exclusive OR gate output, and an output, and said sixth exclusive OR gate including a first input coupled to said fifth exclusive OR gate output, a second input coupled to said fourth exclusive OR gate output and an output forming said sum output.

7. A 7 to 3 counter as defined in claim 6 wherein said fourth circuit means comprises a first NAND gate, a second NAND gate, and a third NAND gate, said first NAND gate including first, second, third, and fourth inputs coupled to the first, second, third, and fourth ones respectively of said inputs, and an output, said second NAND gate including a first input coupled to said fifth exclusive OR gate output, a second input coupled to said fourth exclusive OR gate output, and an output, and said third NAND gate including a first input coupled to said first NAND gate output, a second input coupled to said second NAND gate output, and an output forming said third intermediate carry output.

8. A 7 to 3 counter as defined in claim 1 wherein said second circuit means comprises a first AND gate, a second AND gate, a NOR gate, a first OR gate, a second OR gate, a first NAND gate, and a second NAND gate, said first AND gate including a first input coupled to the first one of said inputs, a second input coupled to the second one of said inputs, and an output, said second AND gate including a first input coupled to the third one of said inputs, a second input coupled to the fourth one of said inputs, and an output, said NOR gate including a first input coupled to said first AND gate output, a second input coupled to said second AND gate output, and an output, said first OR gate including a first input coupled to the first one of said inputs, a second input coupled to the second one of said inputs, and an output, said second OR gate including a first input coupled to the third one of said inputs, a second input coupled to the fourth one of said inputs, and an output, said first NAND gate including a first input coupled to said first OR gate output, a second input coupled to said second OR gate output, and an output, and said second NAND gate including a first input coupled to said NOR gate output, a second input coupled to said first NAND gate output, and an output forming said first intermediate carry output.

9. A 7 to 3 counter as defined in claim 1 wherein said third circuit means comprises an OR gate, a first NAND gate, a second NAND gate, and a third NAND gate, said OR gate including a first input coupled to the fifth one of said inputs, a second input coupled to the sixth one of said inputs, and an output, said first NAND gate including a first input coupled to said OR gate output, a second input coupled to the seventh one of said inputs, and an output, said second NAND gate including a first input coupled to the fifth one of said inputs, a second input coupled to the sixth one of said inputs, and an output, and said third NAND gate including a first input coupled to said first NAND gate output, a second input coupled to said second NAND gate output, and an output forming said second intermediate carry output.

10. A 7 to 3 counter for adding seven digital inputs all having a weight X and providing a three-bit sum of said inputs including a sum bit having a weight X, a first carry bit having a weight 2X and a second carry bit having a weight 4X, said counter comprising:

input means consisting of seven inputs arranged in consecutive order for receiving a binary 1 or a binary 0 input signal level at each of said inputs;

first circuit means coupled to all said inputs and including a sum output for providing at said sum output a binary 1 level responsive to an odd number of said inputs being at a binary 1 level or a binary 0 level responsive to an even number of said inputs being at a binary 1 level;

second circuit means coupled to the first four inputs of said inputs and including a first intermediate carry output for providing a binary 1 level at said first intermediate carry output responsive to two or more of said first four inputs being at a binary 1 level;

third circuit means coupled to the last three inputs of said inputs and including a second intermediate carry output for providing a binary 1 level at said second intermediate carry output responsive to two or three of said last three inputs being at a binary 1 level;

fourth circuit means coupled to all said inputs and including a third intermediate carry output for providing a binary 1 level at said third intermediate carry output responsive to all of the first four inputs of said inputs being at a binary 1 level, or one or three of said first four inputs of said inputs being at a binary 1 level and one or three of the last three inputs of said inputs being at a binary 1 level; and full adder means coupled to said first, second, and third intermediate carry outputs and including a first carry output and a second carry output for providing said first carry bit at said first carry output and said second carry bit at said second carry output responsive to the binary levels at said first, second, and third intermediate carry outputs.

* * * * *